F. R. HODGE.
CONCRETE BUILDING CONSTRUCTION.
APPLICATION FILED JAN. 4, 1909.

999,030.

Patented July 25, 1911.
10 SHEETS—SHEET 1.

WITNESSES
INVENTOR
Frank R. Hodge,
By Edson Bros, Attorneys.

F. R. HODGE.
CONCRETE BUILDING CONSTRUCTION.
APPLICATION FILED JAN. 4, 1909.

999,030.

Patented July 25, 1911.
10 SHEETS—SHEET 2.

Fig. 2.

WITNESSES
Harry King
Ernest H. Hutchinson

INVENTOR
Frank R. Hodge
By Edson Bros., Attorneys.

F. R. HODGE.
CONCRETE BUILDING CONSTRUCTION.
APPLICATION FILED JAN. 4, 1909.

999,030.

Patented July 25, 1911.
10 SHEETS—SHEET 3.

F. R. HODGE.
CONCRETE BUILDING CONSTRUCTION.
APPLICATION FILED JAN. 4, 1909.

999,030.

Patented July 25, 1911.
10 SHEETS—SHEET 6.

F. R. HODGE.
CONCRETE BUILDING CONSTRUCTION.
APPLICATION FILED JAN. 4, 1909.

999,030.

Patented July 25, 1911.
10 SHEETS—SHEET 10.

UNITED STATES PATENT OFFICE.

FRANK ROBINSON HODGE, OF REVERE, MASSACHUSETTS.

CONCRETE BUILDING CONSTRUCTION.

999,030.  Specification of Letters Patent.  Patented July 25, 1911.

Application filed January 4, 1909. Serial No. 470,605.

*To all whom it may concern:*

Be it known that I, FRANK R. HODGE, a citizen of the United States, residing at Revere, in the county of Suffolk and State of Massachusetts, have invented certain new and useful Improvements in Concrete Building Construction; and I do hereby declare the following to be a full, clear, and exact description of the invention, such as will enable others skilled in the art to which it appertains to make and use the same.

My invention relates to concrete building construction.

In this application, the invention is illustrated and described as applied to the construction of a grain elevator containing a plurality of vertical bins.

The primary object of the invention is to economize in the amount of lumber or other material used for supporting the molds used for forming the walls and which molds are carried upward as successive stages of said walls are constructed. Heretofore, it has been necessary to run up scaffolding or supports for the molds all the way from the bottom or ground. In a large building this consumes a vast amount of lumber which is practically wasted as it is usually broken in dismantling or taking it apart. If this scaffolding can be dispensed with, it will, therefore, amount to a very considerable saving in the expense of erecting a building. This saving in material and expense is possible by employing my present invention which contemplates the use of two sets of uprights which are supported upon pins or bolts molded into the concrete and which are raised alternately one above the other as the work progresses. Certain of these uprights are placed within each bin or compartment to hold the inner walls of the molds, while others are arranged on the outside of the building for supporting the outer walls of the molds. Devices hereinafter described are employed for bracing the uprights and holding them in true vertical alinement. Working and safety platforms are also used both within and without the structure, and are adapted to be raised successively to keep up with the molds.

The invention also consists in the features of construction and combinations of parts hereinafter described and specified in the claims.

In the accompanying drawings, illustrating the preferred embodiments of my invention: Fig. 1$^A$ is a broken detailed view showing more distinctly one of the blocks which is nailed to an upright for supporting the working platform. Fig. 2$^A$ is an elevation showing the positions of the uprights and molds when the work of erecting the walls has progressed some distance upward, the working and safety platform being also shown. Fig. 3 is an enlarged plan view of one of the bins or compartments showing the position of the walls of the molds, the tie rods and platform, etc. Fig. 3$^A$ is a detailed sectional view of one of the platforms showing particularly the removable section or trap door. Fig. 6$^A$ is a broken detailed view showing how one of the upper uprights is fastened upon one of the lower uprights by means of splines. Fig. 8 is a broken elevation of one of the metal uprights used for molding the enlarged pilasters. Fig. 9 is a detailed sectional view of still another modified form of upright adapted for molding a round corner in the bin. Fig. 10 is an enlarged broken plan view designed to illustrate more particularly how the walls of the molds arranged on the outside of the building are braced and held in proper position. Fig. 10$^A$ is a broken detailed view showing how one of the uprights on the outside of the building is connected to one of the interior uprights by means of a binding rod or bolt.

Fig. 11 is a detailed view of one of the outside uprights provided with a metal facing for use with metal mold-walls, but showing how a wooden section of wall may be employed across the outer pilasters. Fig. 12 is a similar detailed view except that it shows a metal wall section for use across the outside of the pilasters.

It should be understood that in the construction of a building of the character described, no matter what its size may be, the forms or molds and uprights for supporting the same are raised all over the structure after the casting of each section of concrete so that the work is always on the same level which rises step by step from the foundation until the top of the walls of the building are finished.

While I have illustrated my invention as applied to a grain elevator, it will be understood that it may also be employed for building other styles of structures. It will also be noted that the shape of the bins or compartments generally rectangular in cross-section is a typical form and that the same novel features of construction used for building it may also be employed for erecting an elevator having various other shapes of bins.

As the forms or molds and supporting uprights used in each of the interior bins or compartments are substantially alike, it will suffice to describe the apparatus and method of construction used for erecting the walls of one of said interior bins which will necessarily include the adjacent parts of the forms, etc., arranged in the four surrounding bins. In the same manner, a description of the construction of one of the exterior bins, that is those arranged along the outside wall of the building, will also be sufficient to explain the construction of all of them, except that it will be necessary to point out some features of difference which occur in the formation of the four exterior bins which are arranged at the corners of the elevator. The description of the construction of the exterior bins will include the mold-walls used on the outside of the building and the devices employed for holding them in place as well as the means for supporting the workmen on the outside of the structure. After the description of each of these two main branches of the case, the modifications relating thereto will be taken up and explained.

Figure 1:
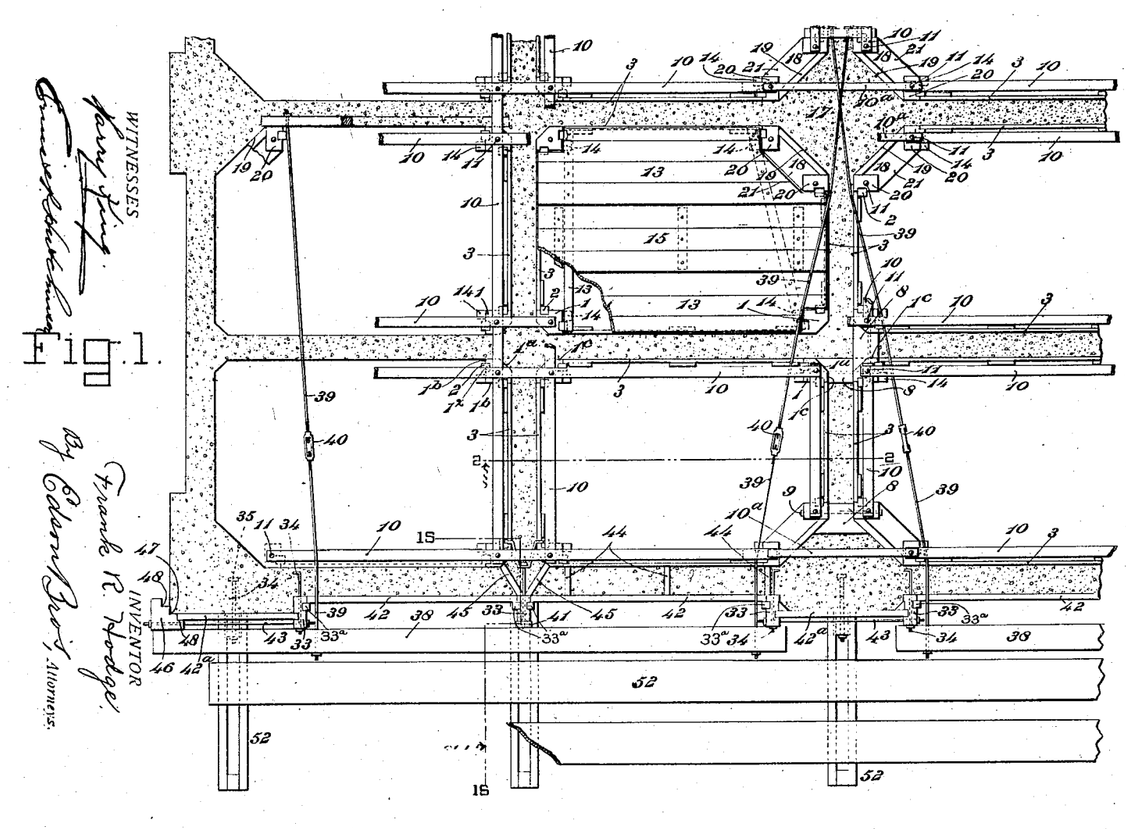
Figure 1 is a broken plan view of a portion of a grain elevator in course of erection, showing how my invention is used.
Figures 1, 1A:
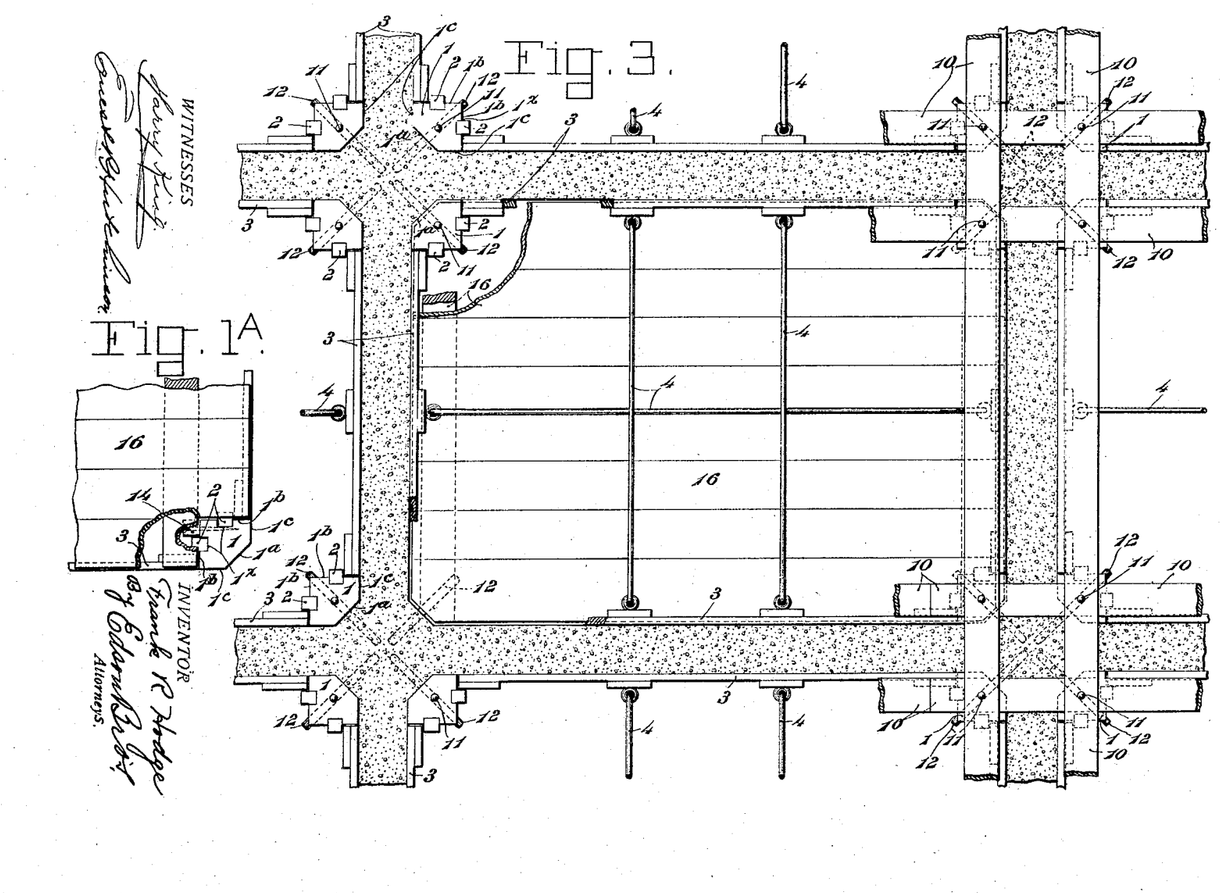
Figure 2:
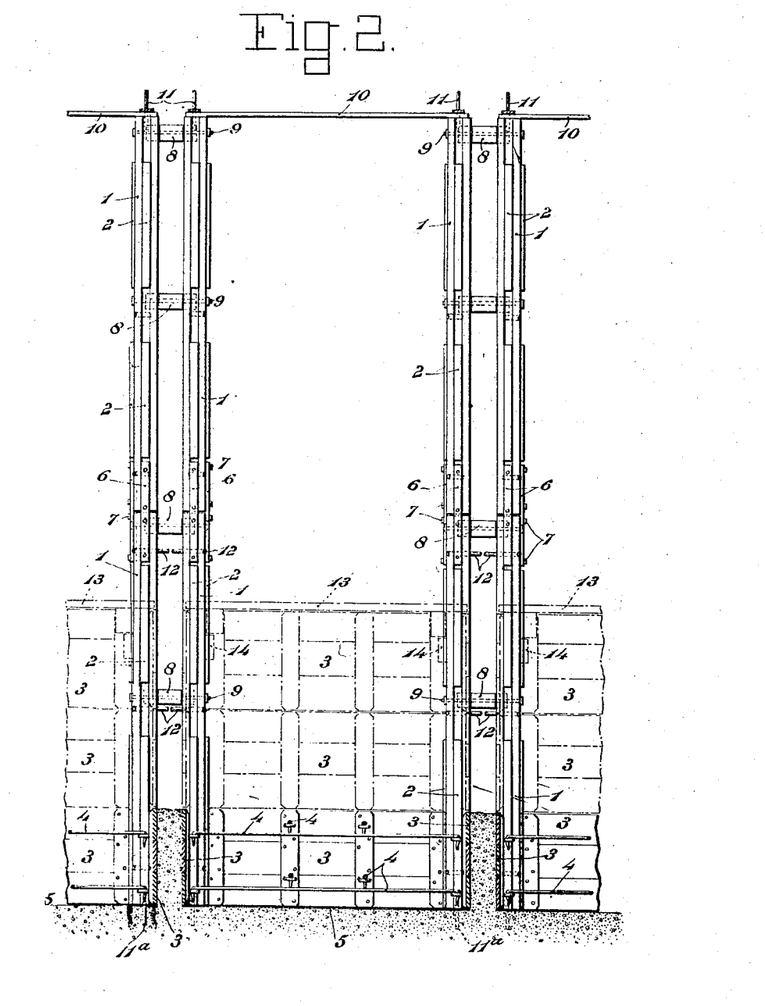
Fig. 2 is an elevation of a portion of the lower part of the structure showing the two sets of uprights used for holding the inside molds in place, this figure being designed to show the first stage of the construction of the walls.
Figures 3A, 6, 6A:
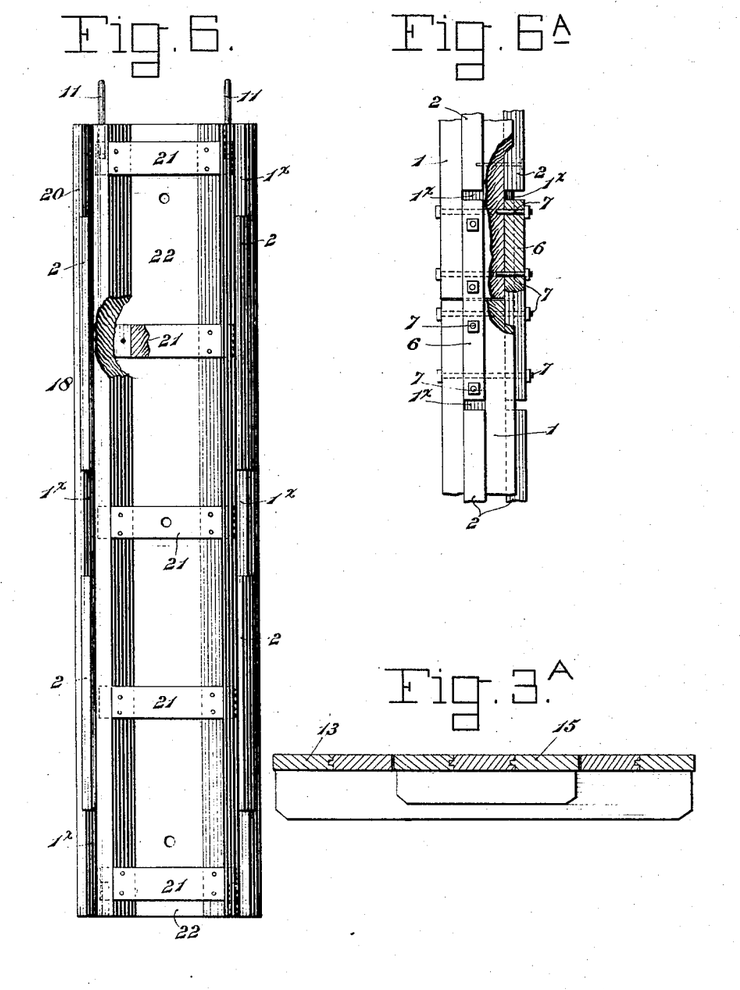
Figures 4, 5:
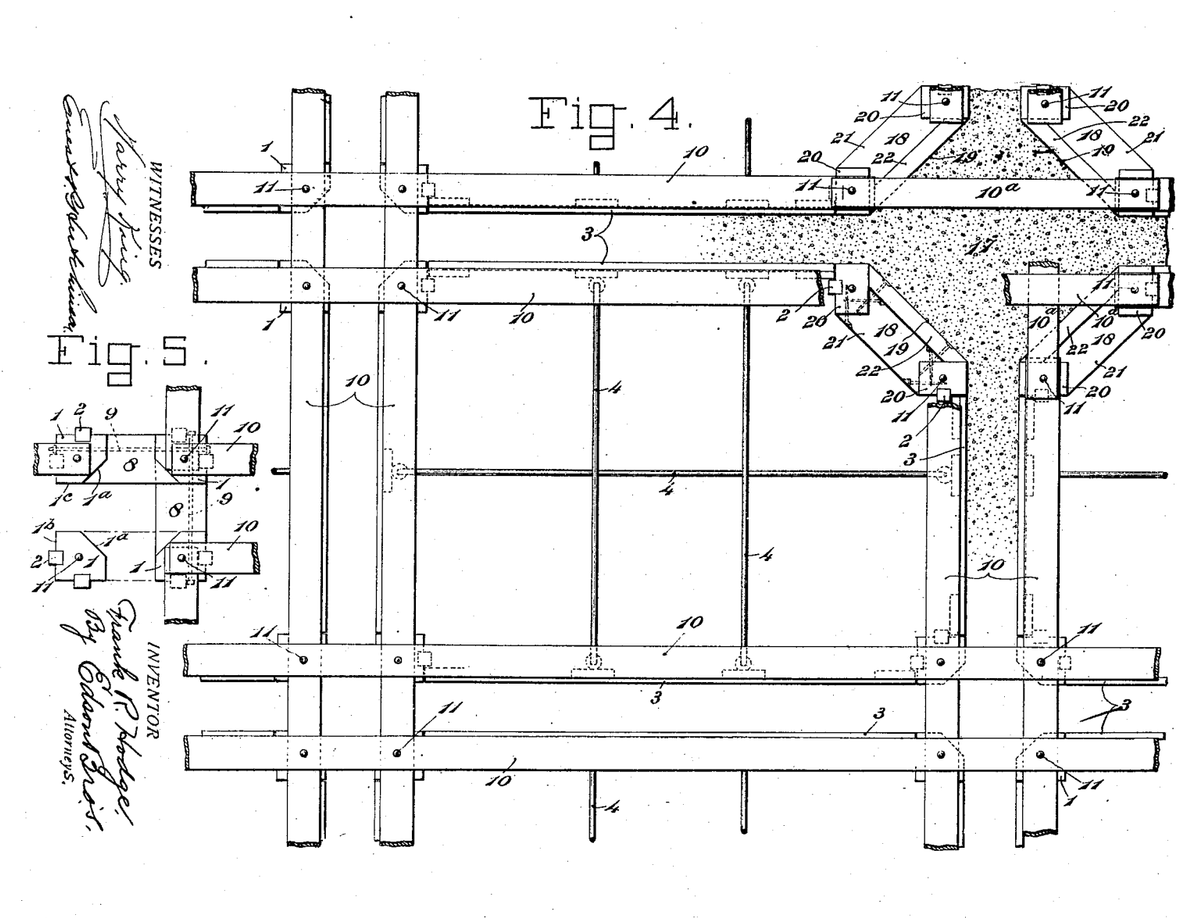
Fig. 4 is an enlarged plan view showing more particularly the binding strips placed upon the tops of the uprights, and a modified construction of uprights employed for molding an enlarged pilaster.
Fig. 5 is a detailed plan view showing the spacing blocks which are placed between the four uprights arranged at the four corners of one of the pilasters.

Referring first, then, to Figs. 1, 1$^A$, 2, 2$^A$, 3, 3$^A$, 4, 5 and 6$^A$, and particularly to Figs. 1$^A$, 2, 2$^A$, 3, 3$^A$, 5 and 6$^A$, two sets of four uprights 1 are used in each bin or compartment. Each of said uprights is preferably eight feet long and is generally square in cross-section but has its outer corner flattened as at 1$^a$. The inner faces 1$^b$ of each upright are grooved or recessed longitudinally at 1$^x$ to receive splines 2 against which the inner mold-walls 3 abut whereby the surfaces of said walls which are presented to the concrete are flush with the outer faces 1$^c$ of said uprights. Said mold walls are held in place by tie-rods 4 extending across the bin in both directions. Said mold-walls are preferably made in sections two feet in height extending across between two adjacent uprights, and three of them are generally used, one above another, at each side as shown in Fig. 2$^A$. At the beginning of the work, however, only one section is placed at each side for molding the first two feet of wall, see Fig. 2. As illustrated in this figure, at the commencement of the operation of building the walls, the uprights are set up, the lower set resting upon the foundation 5 with their bottom ends engaging pins 11$^a$ in said foundation and the other set placed upon the upper ends of said lower set and secured thereto by overlapping splines 6 arranged in the grooves 1$^x$ and fastened by bolts 7 shown best in Fig. 6$^A$. It will be observed that the erection of the uprights in the adjacent compartments will bring said uprights into groups of four which are tied together by spacing blocks 8 inserted at suitable intervals and secured by bolts 9, see Figs. 5 and 2$^A$ as well as Fig. 2. The upper ends of the higher set of uprights in one group are connected together and spaced the proper distance apart by horizontal strips 10 engaging pins 11 removably inserted in the ends of the higher uprights. These strips 10 may be made in separate pieces as illustrated in Figs. 2 and 2$^A$, or continuous so as to extend over several groups of uprights, as indicated in Figs. 3 and 4. Each upright has a suitable number of horizontal holes bored through it diagonally and opening on the flattened surface and the inside corner thereof. Three such holes are shown in each upright, one near each end and the other at about its center, but the number and location of said holes may be changed if it should be found necessary or desirable. Metal pins 12 are inserted into these holes so that they project into the mold and will be cast into the concrete. It is obvious that when so cast into the body or wall of concrete, and the uprights are removed, portions of said pins will be left projecting from the wall which are capable of supporting said uprights when raised to a higher level. After the uprights are in place and braced as just explained, a single two-foot section of mold-wall is put in place at each side and resting on the foundation, the edges of said sections abutting against the splines 2 and being held in place by the tie-rods 4. Then, after two feet of concrete has hardened in the mold, two more sections of mold-wall are placed upon the one already in position thereby running the mold up to six feet in height, as shown in dotted lines in Fig. 2. The working platform 13 is next adjusted on or near the level of the top edge of the uppermost mold-wall-section, said platform being supported on blocks 14 nailed to the uprights, as best illustrated in Fig. 1A. Four feet of concrete is then cast bringing it up to the top of the mold-wall and making in all six feet of concrete wall. After this has set, the working platform is raised and the two lower sections of mold-wall on each side are taken out, cleaned and moved up above the third section which is left in place. It will be understood that the splines 2 are made in short sections so that those securing each side section may be removed, when it is desired to raise said side section, without loosening the sections above it. The working platform, when raised, is secured to the uprights as before at about the level of the top edges of the then highest mold-wall-sections. Four feet more of concrete is then molded, and, when set, the operation of moving up the two lower sections of the mold-wall is repeated, it being understood that the pins 12 are inserted before the concrete reaches their height. The working platform is made with a loose portion or trap-door 15, Fig. 3A. When all three sections of mold-wall have reached a position above the lower sets of uprights, the latter are removed, passed up through the trap door in the working platform and set up above the other set which then becomes the lower set. Before the uprights brought from below are placed in position, the strips 10 and pins 11 must be removed and they are subsequently put in position on the tops of the raised uprights. It will be seen that the repetitions of the operations of raising the mold-wall-sections and sets of uprights will provide for molding the concrete walls to any height desired and that, after the first set of uprights which rested upon the foundation are removed, the uprights will always be supported upon the pins 12 protruding from the concrete wall already formed, see Fig. 2A, thereby dispensing with the necessity of having scaffolding of supports built up all the way from the foundation as was heretofore required. In practice, the shifting of the forms is called a "change" or "grand change", the latter term being used when the uprights as well as the mold-wall-sections are raised. What I call a safety platform 16 is always supported upon pins 12 a suitable distance below the working platform, as also shown in Fig. 2A, and not only serves to prevent the workmen from falling to the bottom of the bin in case they should accidentally slip from the working platform but also to catch particles of concrete which might otherwise pass down to the bottom of the bin. These particles of concrete may be readily removed from the platform, but, if they became attached to the foundation or bottom of the bin, it would involve considerable expense to cut them out with a chisel, as would be necessary. The safety platform may be made just like the working platform but without the trap-door. At certain intervals in the building or elevator it may be necessary to construct an enlarged pilaster, as illustrated at 17 in Figs. 1 and 4, in order to provide an adequate support for the steel framework of the cupola, not shown. To accomplish this the group of four uprights 18 are made larger, that is with broader beveled faces 19 presented to the concrete. Each of these uprights may be formed of two vertical pieces 20, rectangular in cross-section, joined by a suitable number of spacing or bracing blocks 21 and planked as at 22 the full eight feet, see also Fig. 6. One of the pins 11 is preferably placed in each of the vertical pieces 20, making two in each upright 18, for engagement by the horizontal strips 10. Otherwise said uprights 18 are constructed similarly to the uprights 1 and are operated in like manner. Short sections of binding strips 10a are preferably used between the uprights 18 for forming the enlarged pilasters.

Figures 4, 6, 7:
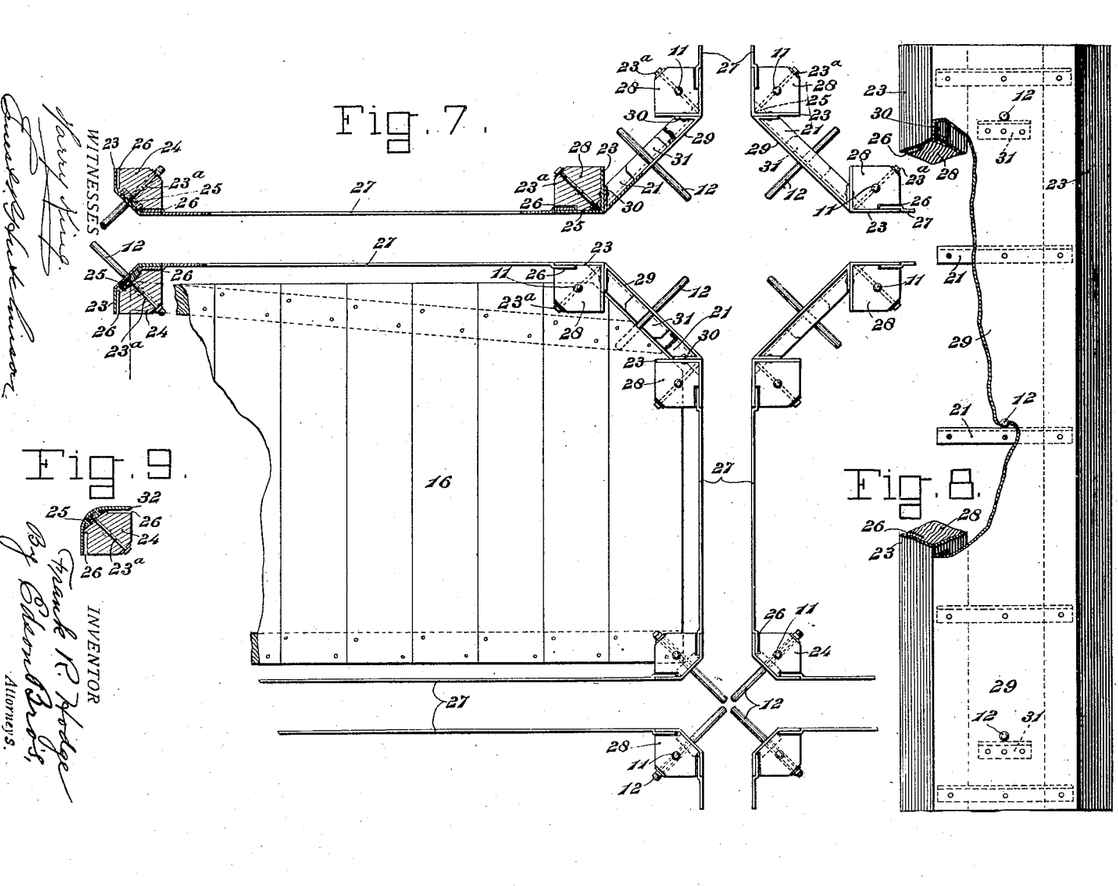
Fig. 6 is a detailed view of one of the modified forms of uprights used for molding the enlarged pilasters.
Fig. 7 is a broken plan view illustrating modified forms of uprights and mold-walls made of metal instead of wood, this modified construction being also shown as applied to uprights for molding an enlarged pilaster.

In Figs. 7, 8 and 9, I have illustrated certain modifications in the construction of the uprights and mold-walls. Each upright instead of being made entirely of wood may be faced with sheet metal 23 secured thereto by bolts 23a passed through the wooden backing 24 and engaging lugs 25 cast or otherwise fastened in the corner of the facing. Said backing is cut away, as at 26, within each edge of the facing thereby forming grooves to receive the stepped edges of the sheet metal mold-wall-section 27. Where an enlarged pilaster is to be molded, the uprights are each composed of two vertical pieces 28 faced with metal as just described, and sheathed with a single metal plate 29 having its edges formed with angular flanges 30 riveted to the facings of said vertical pieces. Brackets or ledges 31 are arranged just before the holes for the pins 12 to support and balance the same in horizontal position. Fig. 9 shows an upright having its metal facing 32 rounded or curved instead of being provided with a square corner. This form may be made of all wood, if desired, and is designed for forming rounded interior corners instead of sharp angular corners in the bins.

Figure 13:
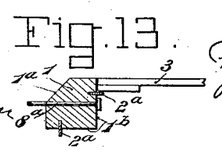
Fig. 13 is a detailed sectional view of one of the uprights showing the use of metal instead of wooden splines for holding the inner walls of the mold in place.

In Fig. 13, 8$^a$ designates a bolt which may be placed between contiguous uprights for drawing them against the spacing blocks. In the same figure, 2$^a$ are metallic splines which may be used in lieu of the wooden splines 2 already described.

Figures 10, 10A, 11, 12:
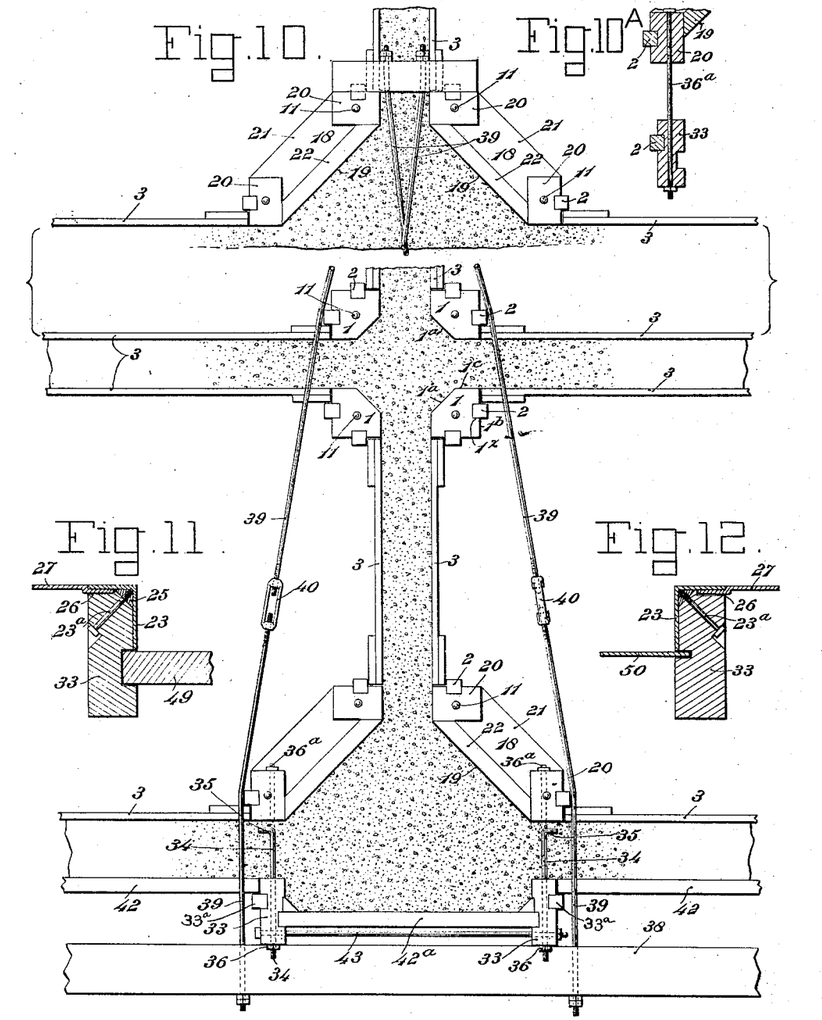
Figures 14, 15, 16:
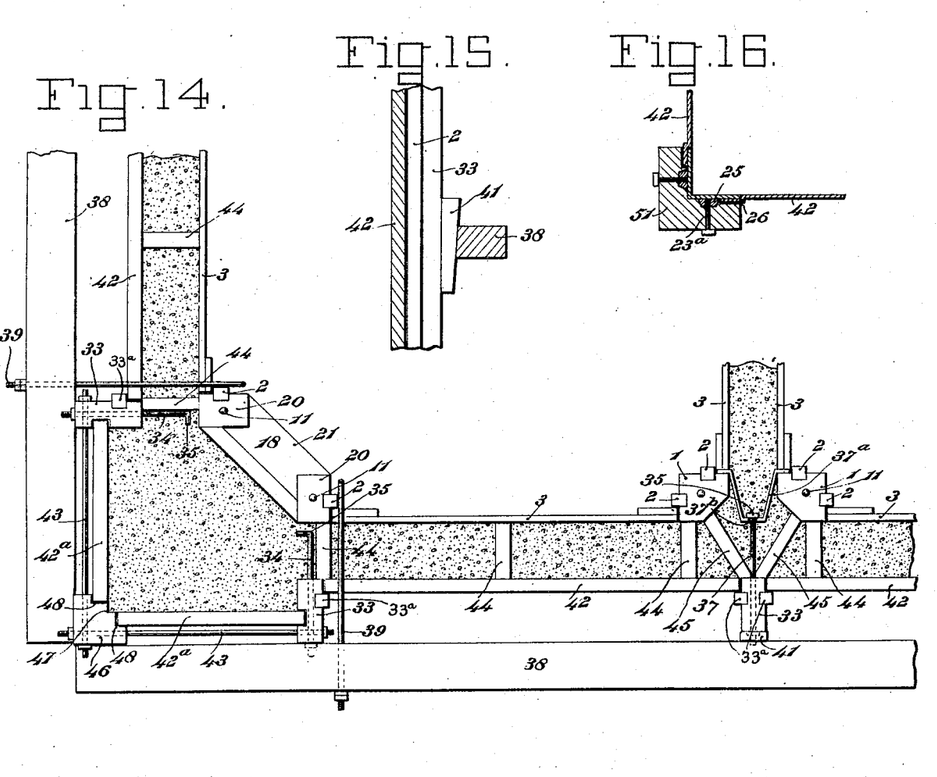
Fig. 14 is an enlarged broken plan view showing more particularly the connections between the outer and inner uprights and walls of the molds.
Fig. 15 is a detailed view showing how a wedge may be used, if required, between the horizontal girders and the outer uprights which are arranged between the protruding pilasters.
Fig. 16 is a detailed sectional view showing a modified construction of uprights for use on one of the outer corners of the building in connection with metal mold-walls.
Figure 17:
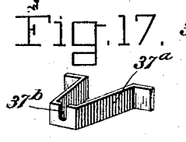
Fig. 17 is a detailed perspective view of one of the V-shaped brackets adapted to engage two adjacent interior uprights and connect by means of a bolt with one exterior upright.
Figures 18, 19:
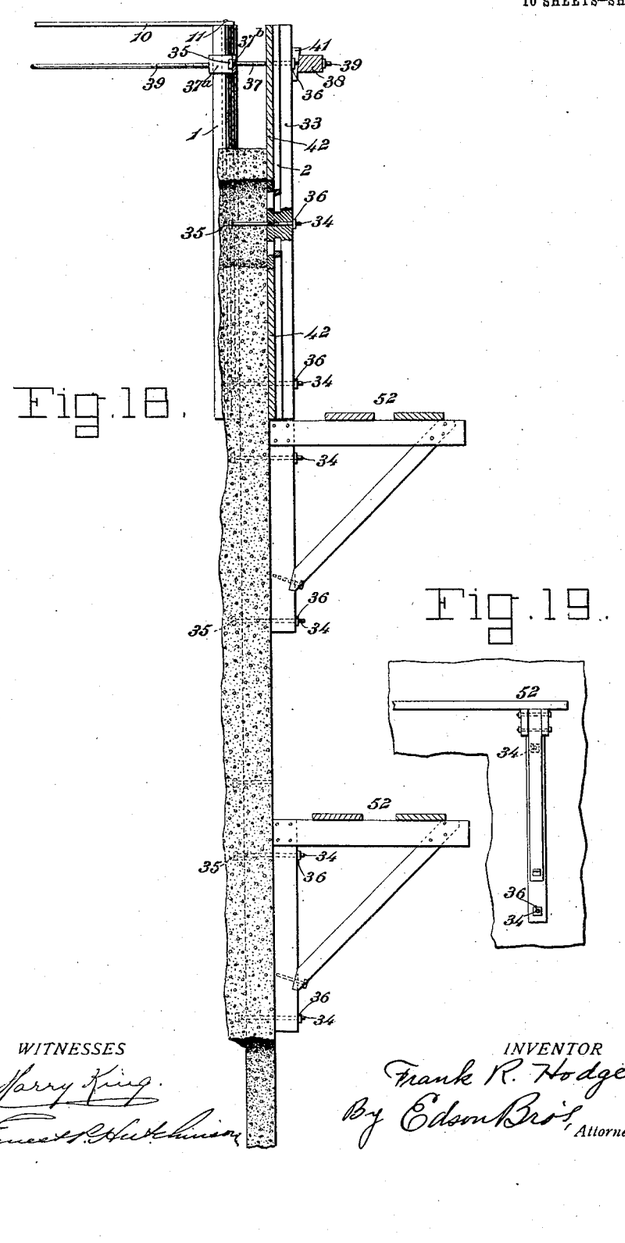
Fig. 18 is a broken elevation of a portion of the outer wall of the building showing how the exterior platforms or scaffolds are secured to the wall and also how the uprights are held in place.
Fig. 19 is a broken detailed elevation of one of the brackets for supporting said exterior platforms.

As previously stated, in order to mold the bins arranged along the outside of the elevator or building, it is necessary to provide external mold walls 42 and employ some means for supporting and bracing them in position so that they may also be raised successively like the interior mold-wall-sections. The apparatus I employ for this purpose is illustrated in Fig. 1 but is best shown in Figs. 10, 14 and 18. Uprights 33 are erected at suitable intervals and are supported by bolts 34 cast into the concrete in the same manner as the bolts 12 on the interior of the bins. These bolts 34, however, are preferably headed or bent at their inner ends, as at 35, to prevent them from being pulled out, and they are threaded on their outer ends to receive nuts 36 which clamp upon the outer faces of the uprights. The upper ends of said uprights which extend beyond the concrete are plumbed up by means of adjustable bolts 37 engaging V-shaped brackets 37$^a$ each interposed between two adjacent interior uprights, where the outer uprights are arranged intermediate of said inner uprights. Said V-shaped brackets are slotted, as at 37$^b$ to allow ready adjustment and removal of the bolts 37. When said outer uprights are in alinement with the inner ones, as at each side of the external pilasters, single bolts or brace-rods 36$^a$, illustrated in full lines in Fig. 10$^A$, are used. The outer mold-walls are further braced, as a whole, by horizontal girders 38 tied to interior uprights by rods 39 preferably provided with turn-buckles 40 for the purpose of adjustment. If required, a wedge 41 may be driven in between the girders and the uprights arranged intermediate of adjacent sets of tie-rods 39, which are preferably placed at the sides of the external pilasters, as shown. The external mold-walls are also held by splines 33$^a$ fitted in grooves in the uprights 33 similarly to the way in which the splines 2 are attached to the interior uprights 1. Said splines 33$^a$ are likewise made in sections to permit of the outer wall sections being separately removed and raised. The short pieces 42$^a$ of the external mold-walls which run across the pilasters are not held by splines but are themselves inserted in grooves in the uprights. Brace rods 43 are arranged between the uprights behind said short pieces. These short pieces 42$^a$ may be made the full length of the grooved uprights to which they are attached, and may be moved up each time with said uprights.

The external mold-walls are separated from the interior mold-walls by spacing blocks 44 inserted at suitable intervals. Obliquely arranged spacing blocks 45 are placed between the outside and inside uprights where one of the former comes intermediately of two of the latter, see Figs. 1 and 14.

A peculiarly shaped upright 46 is employed on the outer corners of the structure. The inner face of this upright is formed with three steps, the middle one 47 of which is designed for forming the corner of the concrete, while the other two 48 support the mold-wall-sections. The ends of the horizontal girders 38 extend behind these corner uprights and serve, together with the brace rods 43, to hold said uprights plumb. It will be noted that the provision of the middle step 47 insures the formation of a perfectly sharp corner on the concrete whereas, if the mold walls extended all the way to the corner, there would be danger of some of the concrete working between their ends and giving a ragged appearance to the concrete at the corner.

Figs. 11 and 12 illustrate modified forms of exterior uprights having metal facings and adapted for use with metallic mold walls. Fig. 11 shows this modified form of upright used with wooden short wall sections 49 extending across the pilasters, while in Fig. 12, the use of metallic short wall sections 50 is illustrated.

Fig. 16 is a modified construction of an outer corner upright 51 having an inner metallic facing and intended for use, in place of the stepped upright 46, with metallic mold-walls.

To support the workmen on the outside of the building I provide two scaffolds 52 similarly constructed and adapted to be alternately raised one above the other up the wall as the same is molded, these scaffoldings being operated in practically the same manner as the working and safety platforms inside the bins. Each scaffolding is secured upon the bolts 34 by means of nuts placed on the outer ends in the same manner as the outside mold-walls are fastened.

I claim:

1. A collapsible mold, for constructing a wall of the character described, comprising uprights and side pieces, each of said uprights being made in two sections adapted to be alternately raised one above the other, vertical pins arranged in sockets in the ends of the sections of said uprights for removably securing the two sections together, and projecting from the upper end of the higher section of each upright, connecting strips engaging the latter pins on the several uprights for the purpose specified, and means for fastening said side pieces between said uprights.

2. A collapsible mold, for constructing a continuous inclosing wall of the character described, comprising interior and exterior uprights having vertical grooves therein, splines fitted in said grooves, side pieces extending between said uprights and abutting against said splines, and tie rods connecting opposite ones of the side pieces of the inner portion of the mold for holding them in place.

3. A collapsible mold, for constructing a wall of the character described, comprising uprights and side pieces, said uprights being made in two sections adapted to be alternately raised one above the other, said sections having registering vertical grooves therein, splines arranged in said grooves and overlapping the sections for securing them together, means for holding the upper ends of the uprights in proper position relative to each other and means for fastening said side pieces to said uprights.

4. A collapsible mold, for constructing a wall of the character described, comprising uprights and side pieces, said uprights being made in two sections adapted to be alternately raised one above the other, said sections having registering vertical grooves therein, splines arranged in said grooves, the side pieces of the mold abutting against said splines, means to hold said side pieces in place, other splines arranged in said grooves and overlapping the two sections for securing them together, and means for holding the upper ends of the uprights in proper position relative to each other.

5. A collapsible mold, for constructing a wall of the character described, comprising corner uprights and side pieces, means for securing said side pieces between said uprights, and a working platform supported on blocks fastened to said uprights.

6. A collapsible mold, for forming walls inclosing and separating a plurality of compartments, comprising uprights and side pieces arranged between said uprights, said uprights being placed together in groups for forming the pilasters, certain of said uprights, in the same group, being broader and cut away more on the inside than those in the other groups for making an enlarged pilaster, each of said broader uprights being made of two vertical timbers arranged in alinement with the uprights in said other groups and sheathed across, and means for holding said uprights in proper position relative to each other.

7. A collapsible mold, for forming walls inclosing and separating a plurality of compartments, comprising uprights and side pieces arranged between said uprights, said uprights being placed together in groups for forming the pilasters, certain of said uprights, in the same group, being broader and cut away more on the inside than those in the other groups for making an enlarged pilaster, each of said broader uprights being made of two vertical timbers arranged in alinement with the uprights in said other groups and sheathed across, removable pins in the upper ends of the uprights, two being arranged in each of said broader uprights, one in each vertical timber, and connecting strips engaging said pins for the purpose specified.

8. A collapsible mold, for forming an inclosing wall, comprising interior uprights and side pieces, exterior uprights and side pieces, means for fastening said side pieces to said uprights, spacing blocks interposed between the interior and exterior side pieces and uprights, and devices for tying an exterior upright, arranged between two interior uprights, to said latter uprights comprising a V-shaped bracket engaging said interior uprights and connected to an adjustable bolt passed through the exterior upright.

9. A collapsible mold, for forming an inclosing wall, comprising interior uprights and side pieces, exterior uprights and side pieces, means for fastening said side pieces to said uprights, spacing blocks interposed between the interior and exterior side pieces and uprights, and devices for tying an exterior upright, arranged between two interior uprights, to said latter uprights comprising a V-shaped bracket engaging said interior uprights and connected to an adjustable bolt passed through the exterior upright, said bracket having an open slot to provide for the ready engagement and removal of said bolt.

In testimony whereof, I affix my signature, in presence of two witnesses.

FRANK ROBINSON HODGE.

Witnesses:
CHARLES H. BATES,
ELIZA H. MACADAM.